US006624913B1

(12) United States Patent
Kellogg

(10) Patent No.: US 6,624,913 B1
(45) Date of Patent: Sep. 23, 2003

(54) METHOD OF ELECTRONIC PROCESSING OF EXPOSED PHOTOGRAPHIC MATERIAL

(75) Inventor: Lillian M. Kellogg, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/535,317

(22) Filed: Mar. 27, 2000

(51) Int. Cl.[7] .......................... H04N 1/04; H04N 1/23; G03C 5/00; G01N 23/00

(52) U.S. Cl. ...................... 358/477; 358/478; 358/300; 430/394; 399/2; 250/310

(58) Field of Search ............................... 358/478, 300; 403/394, 21, 48, 97; 399/2, 411; 250/310

(56) References Cited

U.S. PATENT DOCUMENTS 4,788,131 A * 11/1988 Kellogg et al. ............. 430/394
5,350,651 A * 9/1994 Evans et al. .................. 528/59

OTHER PUBLICATIONS

Hasegawa et al., "Detection of Latent Image by Microwave Photoconductivity," *Journal of Imaging Science*, vol. 30, No. 1, Jan./Feb. 1986, pp. 13–15.

Kellogg et al., "Investigation of photoconductivity in photographic films at 77°K with microwave methods," *Photographic Science and Engineering*, vol. 16, No. 2, Mar./Apr. 1972, pp. 115–119.

* cited by examiner

*Primary Examiner*—Edward Coles
*Assistant Examiner*—Jason Sherrill
(74) *Attorney, Agent, or Firm*—Thomas H. Close

(57) ABSTRACT

A method of electronic processing of a latent image from a photographic element, the method employing pulsed radiation and radio frequency photoconductivity apparatus having a sample capacitor with a gap, including the steps of: placing the element in an electromagnetic field adjacent the sample capacitor; providing an advance mechanism for advancing the photographic element past the capacitor; scanning the element through the gap in the sample capacitor with a pulsed, focused beam of radiation; directly measuring the photoelectron response of the element and recording the resulting signals from the radio frequency photoconductivity apparatus; and advancing the element and repeating the exposing and measuring steps to provide a two dimensional readout of the latent image on the photographic element at ambient temperature or below.

12 Claims, 6 Drawing Sheets

METHOD OF ELECTRONIC PROCESSING OF EXPOSED PHOTOGRAPHIC MATERIAL

FIELD OF THE INVENTION

The present invention relates to electronic processing of exposed photographic material. In particular, this invention relates to the use of a radio frequency photoconductivity measurement to scan a photographic element to detect a latent image in the exposed photographic material.

BACKGROUND OF THE INVENTION

The latent image in silver halide crystals is formed through the excitation of free charge carriers by absorbed photons and their subsequent trapping and reaction with interstitial silver ions within the silver halide grain structure to form latent image centers (i.e. electron trapping centers). The use of electromagnetic radiation to detect latent image formation in exposed silver halide grains has been recognized in the photographic art. For example, the January/February 1986 issue of Journal of Imaging Science, Vol. 30, No. 1, pp. 13–15, in an article entitled "Detection of Latent Image by Microwave Photoconductivity", describes experiments designed to detect latent image formation in silver halide using microwave photoconductivity. The technique, which is operated at room temperature, is recognized as potentially useful in detection of latent images without the need for conventional chemical development solution processing.

Carriers which are thought to play an important role in the formation of latent image centers in silver halide grains are believed to be electrons, holes, and interstitial silver ions. The mobility of electrons is far greater than that of holes or interstitial silver ions so that conductivity attributed to photoelectrons is expected to be detectable by measurement of photoconductivity of silver halide grains through use of microwave radiation. Such a measurement has been reported using low temperatures, L. M. Kellogg et al., Photogr. Sci. Eng. 16, 115 (1972).

U.S. Pat. No. 4,788,131, issued Nov. 29, 1988 to Kellogg et al., entitled "Method of Electronic Processing of Exposed Photographic Material" discloses a method for electronically processing exposed photographic materials for detection and measurement of latent images contained therein. The method includes the steps of placing the element in an electromagnetic field and cooling the element to a temperature between about 4 to about 270K to prevent further image formation; subjecting the element to a uniform exposure of relatively short wavelength radiation; exposing the element to pulsed, high intensity, relatively longer wavelength radiation to excite electrons out of image centers; and measuring any resulting signal with radio frequency photoconductivity apparatus.

The shortcomings of this approach are that it needs to be performed at low temperatures, and there is no easy technique disclosed for making a two dimensional scan of the element.

Accordingly, there is a need for an improved technique for detection and measurement of latent images in silver halide photographic materials.

SUMMARY OF THE INVENTION

The need is met according to the present invention by providing a method of electronic processing of a latent image from a photographic element, the method employing pulsed radiation and radio frequency photoconductivity apparatus having a sample capacitor with a gap, that includes the steps of: placing the element in an electromagnetic field adjacent the sample capacitor; providing an advance mechanism for advancing the photographic element past the capacitor; scanning the element through the gap in the sample capacitor with a pulsed, focused beam of radiation; directly measuring the photoelectron response of the element and recording the resulting signals from the radio frequency photoconductivity apparatus; and advancing the element and repeating the exposing and measuring steps to provide a two dimensional readout of the latent image on the photographic element at ambient temperature or below.

In a preferred embodiment, the photographic element has a Ruthenium hexacyano doped tabular grain emulsion with a grain size greater than 2 $\mu$m, and the measurement of the photoelectron response is conducted at ambient temperature.

The present invention has the advantage of eliminating the need for chemical processing of photographic film for development. A simpler film format can be employed with the present invention that does away with the need for dispersions or interlayers, thereby simplifying and reducing the cost of the film manufacturing process. Only one emulsion per color is required since the resulting signal from individual silver halide grains is proportional to the exposure level of the grain.

DETAILED DESCRIPTION OF THE INVENTION

The light sensitive elements in photographic systems are silver halide emulsion grains. These grains are photoconductors, i.e. when they are exposed, either in the intrinsic absorption region or in the dye absorption region, electrons are excited into the conduction band and these electrons are free to move through the grain. If these grains are placed in an electromagnetic field and then exposed, this photoconductivity can be detected by measuring the change in the field.

In the examples presented here the photoconductivity is measured in the following way. A photographic film is placed in a measurement capacitor in a tuned radio frequency circuit. The change in the capacitance of this tuned circuit is then measured when the silver halide grains in the film are exposed and the free electrons are excited into the conduction band.

This technique can be used to detect the level of exposure the silver halide grains have received because new electron traps are formed in the grains as a result of the exposure. These traps, which decrease the photoconductivity, are formed when mobile interstitial silver ions in the silver halide grain react with the photoelectrons generated during exposure and form $Ag_n^0$ centers which associate with interstitial ions and act as electron traps. The photoconductivity, then, decreases as the exposure level the grain has received, increases.

In order to use this technique to scan an image, it is necessary to provide a measurement capacitor that is sensitive enough to detect a small spot size for good image resolution, and would allow the film to be scanned in two dimensions. The following characteristics are necessary to achieve these goals:

1. The sample should be placed in the capacitor so the long dimension of the tabular grain is parallel to the (RF) field.

2. The capacitor gap should be very small, i.e. on the order of the image resolution required.

3. The photographic element should pass through or over the electrodes to allow 2 dimensional imaging.

Figure 1:
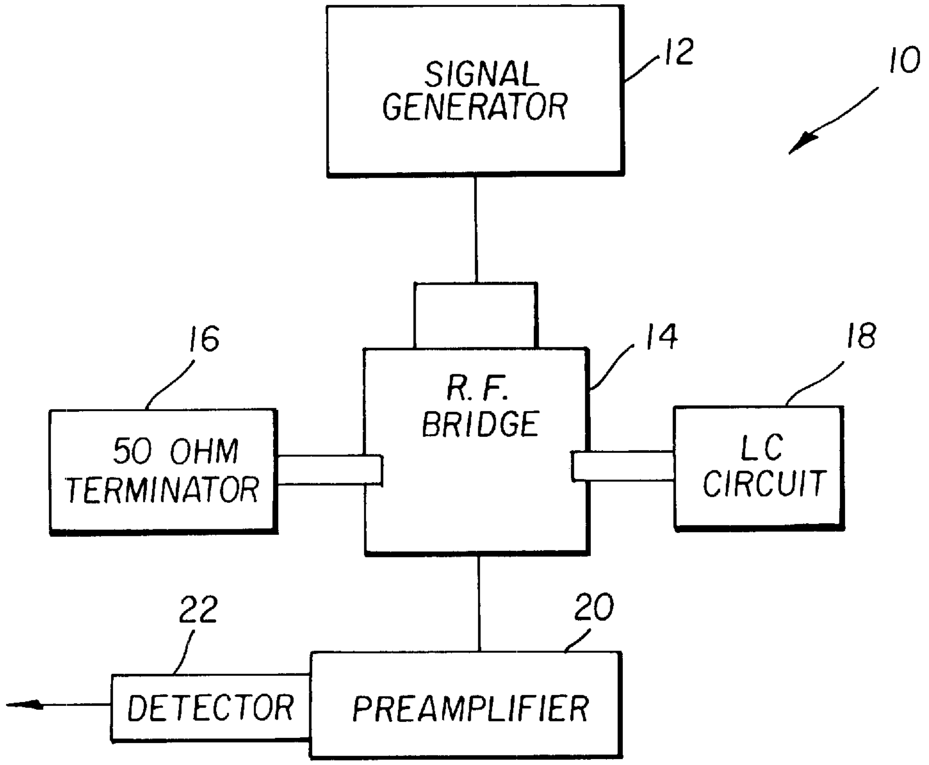
FIG. 1 is a schematic drawing of a radiofrequency photoconductivity measurement apparatus for use in the electronic process of the present invention.
Figure 2:
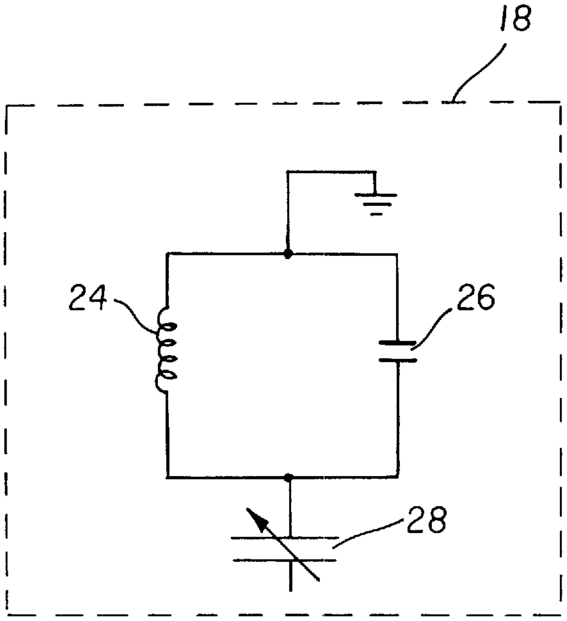
FIG. 2 is a detailed view of the tuned LC circuit of FIG. 1.
Figure 3:
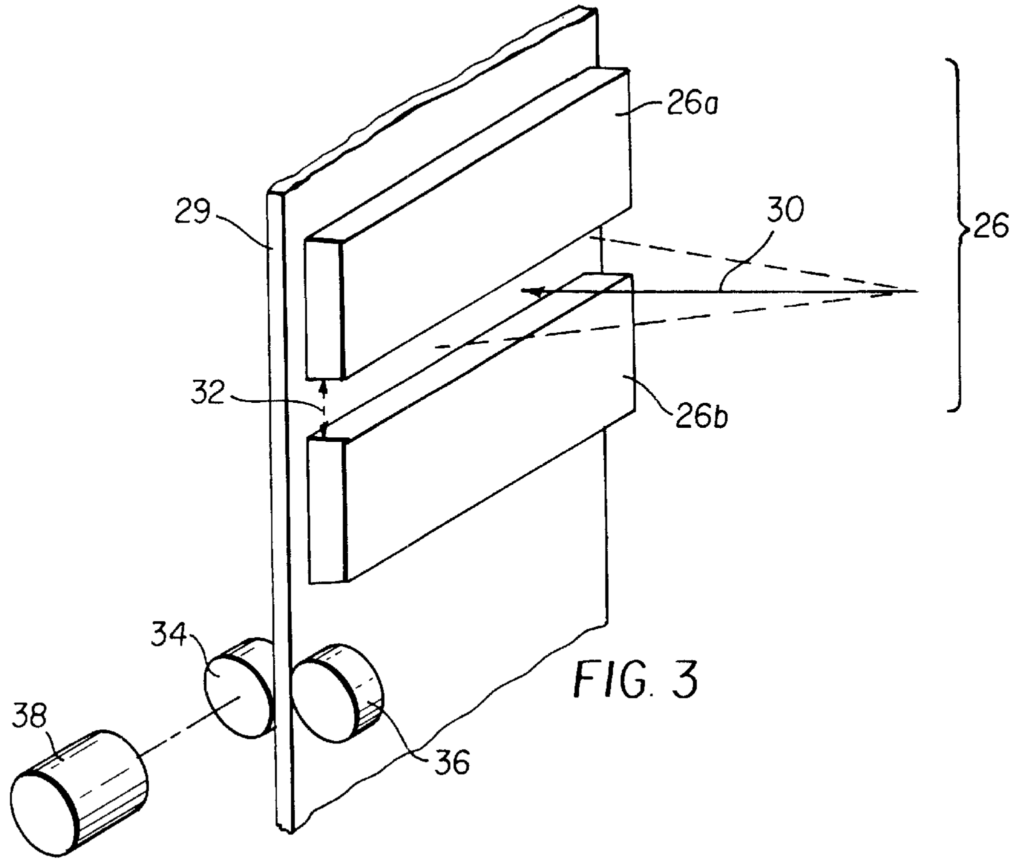
FIG. 3 is a detailed view of the capacitor electrode configuration of the present invention.

Referring to FIG. 1, the method of the present-invention is carried out on radio frequency photoconductivity measurement apparatus 10 that includes a radiofrequency signal generator 12 and a radiofrequency bridge 14. In association with bridge 14 is a 50 ohm terminator 16 and a tuned LC circuit 18. A preamplifier 20 is provided as is detector 22. FIG. 2 illustrates, in greater detail, the tuned LC circuit 18 of FIG. 1 wherein is shown inductor 24 along with sample capacitor 26 and variable capacitor 28. FIG. 3 shows in detail the sample capacitor 26, which includes two plates 26*a* and 26*b* arranged coplanar with each other and adjacent a photographic film element 29. A pulsed focused scanning light beam 30 is directed onto the photographic film element 29 through a gap 32 formed by the capacitor plates 26*a* and 26*b*. Preferably the gap is small, having a size on the order of the diameter of the scanning beam 30 (e.g. 20–100 $\mu$m). A drive mechanism includes drive wheel 34 and idle wheel 36 and a motor 38 connected to drive wheel 34. After the light beam 30 scans the element 28, the advance mechanism advances the element 28 by one scan line, and the scan is repeated.

Figure 4:
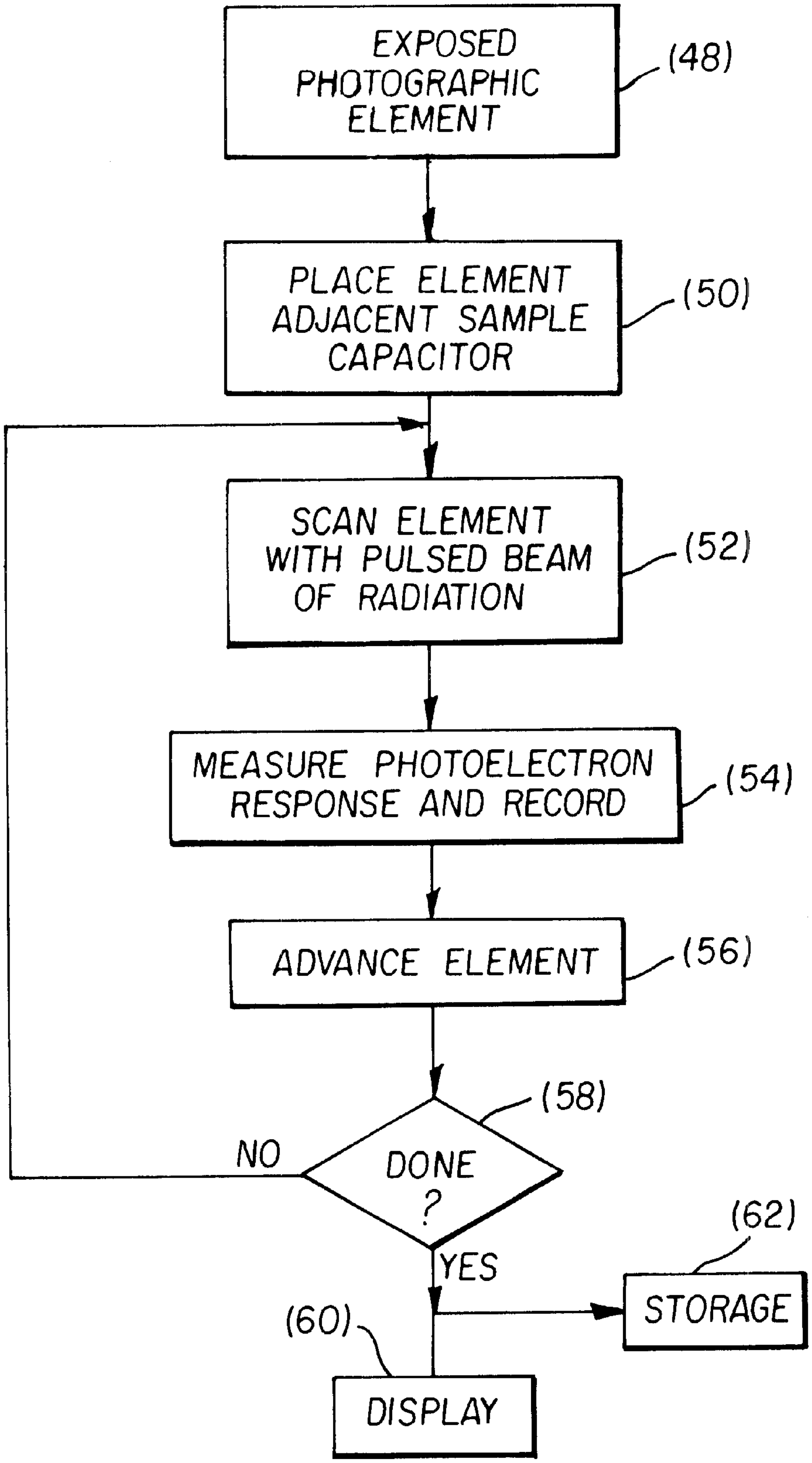
FIG. 4 is a flow diagram showing the individual steps in the electronic process of the present invention.

Referring to FIG. 4, the method of the present invention includes the steps of providing (48) an exposed photographic element; placing (50) the element 29 adjacent to the sample capacitor 26; and scanning (52) the element 29 with the pulsed beam of light 30. The photoelectron response is directly measured and recorded (54) by the radio frequency photoconductivity apparatus 10 and the element 29 is advanced (56) by one scan line. A check (58) is made to determine if the element has been completely scanned. If not, the next line is scanned (52) and the process is repeated until the element 29 has been completely scanned. After the element 29 has been scanned to read out the latent image, the image signal can be displayed (60) or stored (62) for later viewing.

Figure 5:
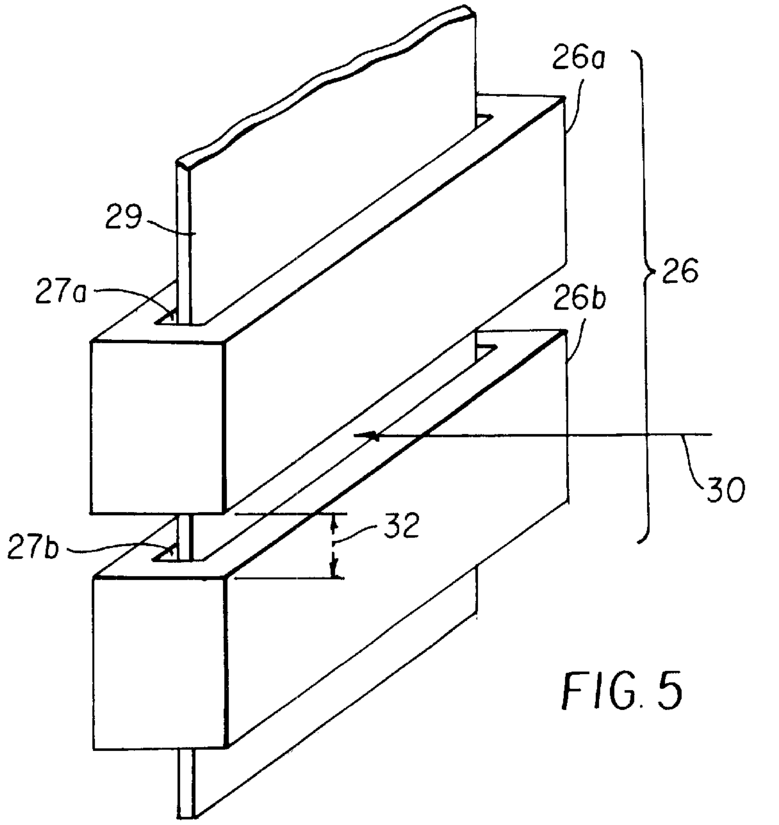
FIG. 5 is a detailed view of an alternative embodiment of the electrode configuration.

FIG. 5 shows in detail an alternative configuration for sample capacitor 26 which includes two plates 26*a* and 26*b* with slots 27*a* and 27*b* through the center of each plate. These plates are arranged coplanar with each other. A photographic element 29 passes through slots 27*a* and 27*b* into the (RF) field established between the two plates. A pulsed focused scanning light beam 30 is directed onto element 29 through gap 32 formed by the capacitor plates 27*a* and 27*b*.

Figure 6:
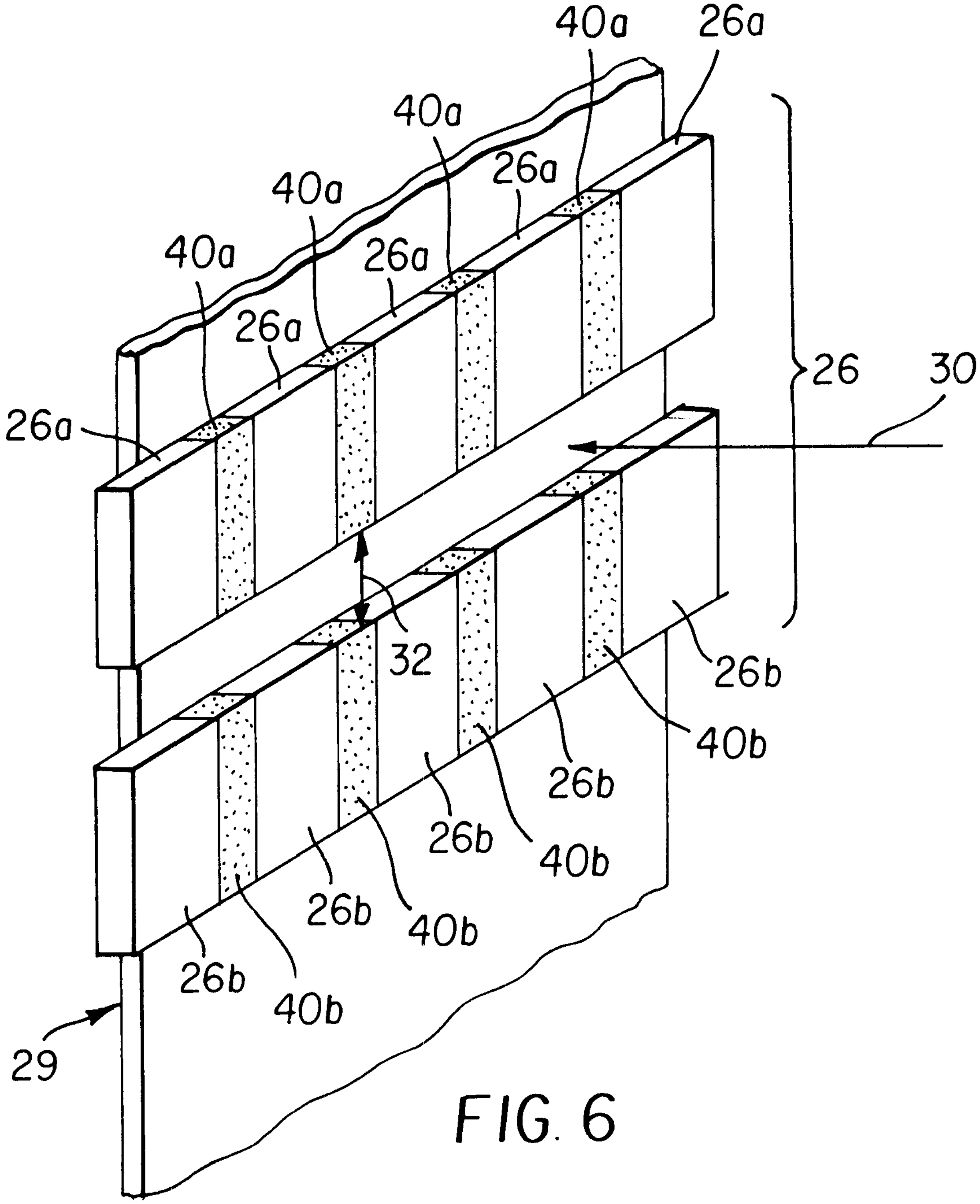
FIG. 6 is a schematic view of a further alternative embodiment of the electrode configuration, wherein the electrodes are segmented.

FIG. 6 shows in detail a possible capacitor array 26 which includes multiple (e.g. 5) plates 26*a* arranged coplanar with corresponding plates 26*b*. All of these plates are adjacent to a photographic element 29. These plates are separated by insulating regions 40*a* and 40*b*. A pulsed focused scanning light beam 30 is directed onto element 29 through the gap 32 between the plates. This arrangement increases the sensitivity of the apparatus by employing smaller capacitors. The drawback to this arrangement is that it has gaps between the capacitors where the film cannot be scanned. In order to scan the entire width of the film element 29, a second capacitor array and scanning beam shifted with respect to the first array can be provided, such that the locations of the capacitor plates in the second array occur in the gaps of the insulators in the first array. It will be understood that although each capacitor plate in FIG. 6 is shown with 5 elements, more or fewer than 5 may be used in the practice of the present invention.

Figure 7:
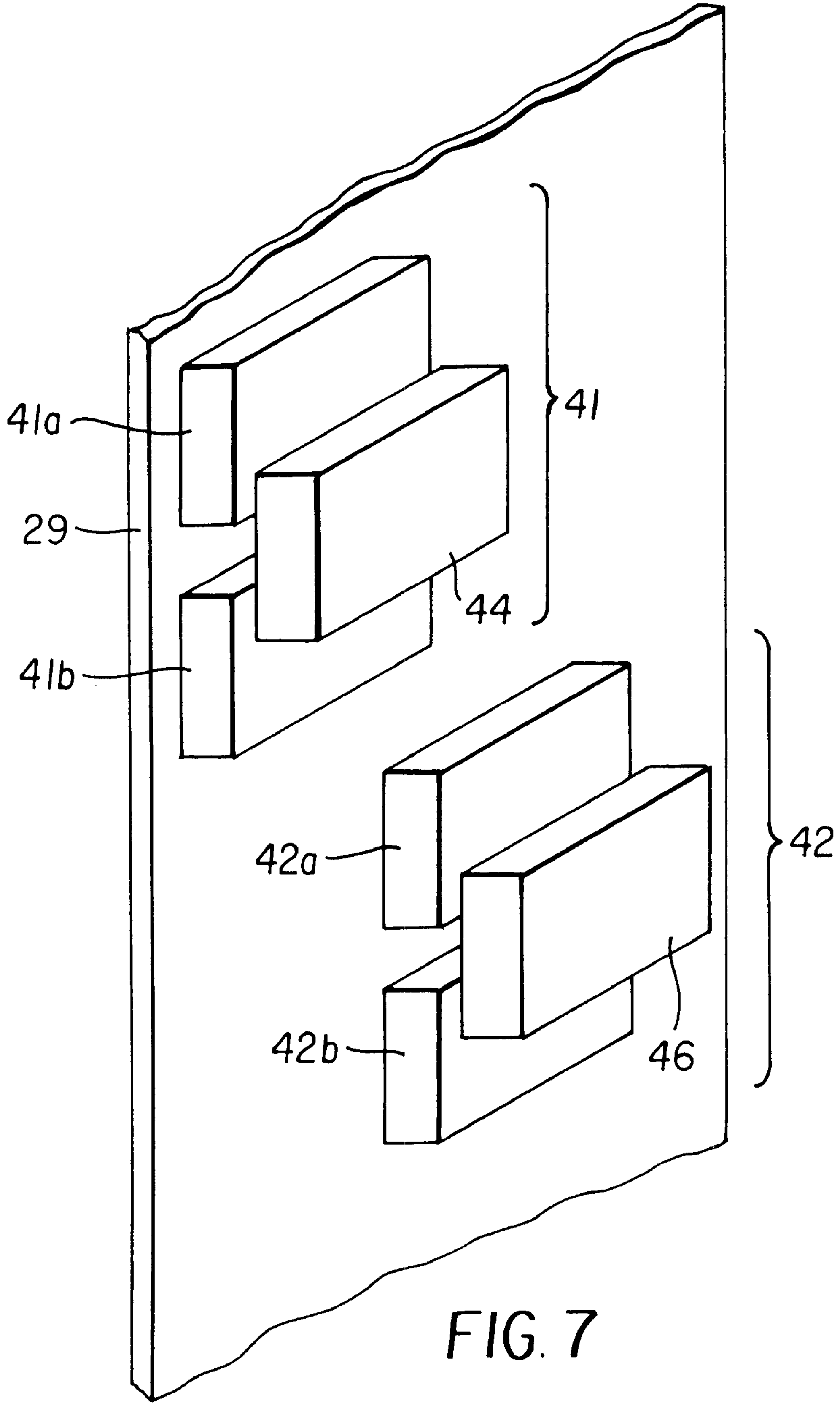
FIG. 7 is a schematic view of a still further alternative embodiment of the electrode configuration wherein segmented electrodes are provided with LED arrays for scanning the photographic element.

FIG. 7 shows an alternative embodiment of the present invention having a capacitor array including capacitor 41 with coplanar plates 41*a* and 41*b* and capacitor 42 with coplanar plates 42*a* and 42*b*. Associated with these capacitors are LED arrays 44 and 46 respectively for scanning the photographic element through the gaps between the capacitor plates. Each capacitor and associated LED array scans a separate portion of the film, and are shown staggered in the direction of film travel so that they can be easily arranged to scan the entire width of the film. Although two such arrays are shown it should be understood that any number of such arrays can be employed across the width of the film.

Figure 8:
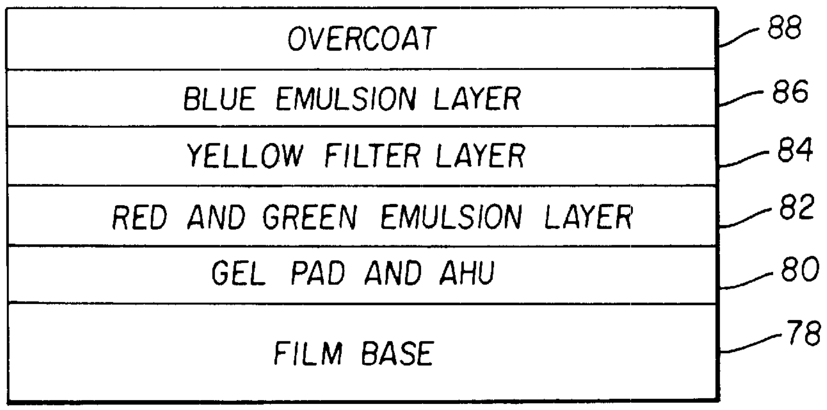
FIG. 8 is a schematic diagram of a film element particularly useful with the present invention.

FIG. 8 shows a schematic diagram for a color photographic film element useful with the present invention. This color film element consists of a film base 78 coated with a gel pad and antihalation layer 80. An emulsion layer 82 is coated over the gel pad. Preferably this emulsion layer includes tabular light sensitive silver halide grains. This emulsion layer contains both the green and the red sensitized emulsions. On top of the red and green sensitized emulsion layer is a yellow filter layer 84 to prevent blue radiation from reaching the red and green emulsion layer 82. A blue sensitized emulsion layer 86 (preferably also a tabular grain emulsion) is coated on top of the filter layer 84 and a gelatin overcoat 88 is coated over the blue emulsion layer 86 for protection. The color information is recovered from an exposed film element of this type by scanning the element separately with red, green and blue beams of light.

Figure 9:
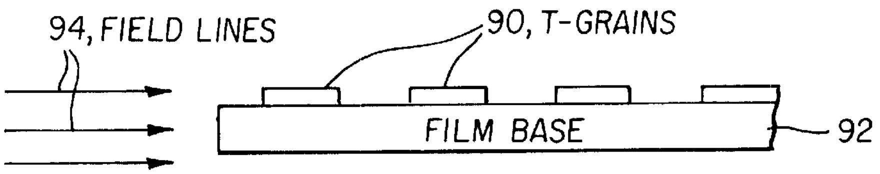
FIG. 9 is a schematic diagram useful in describing the orientation of tabular film grains with respect to the electric field produced by sample capacitor according to a preferred mode of practicing the present invention.

FIG. 9 illustrates the orientation of the tabular silver halide grains 90 and the film base 92 with respect to the electric field 94 in the preferred embodiment of the film element. For other emulsion types other field orientations may be useful.

EXAMPLE 1

A 4.0 $\mu$m×0.11 $\mu$m Ag(Br,I) (4% I) T-Grain emulsion doped with $Ru(CN)_6^{-3}$ at 25 ppm and dyed with 0.5 mmol/

Ag mol of a blue sensitizing dye was coated at a silver coverage of 2.6 g Ag/$m^2$ and 4.3 g gel/$m^2$ over a film support previously coated with an antihalation (AHU) layer.

Five 35 mm×300 mm samples were prepared for measurement in a radiofrequency (RF) photoconductivity measurement apparatus according to FIG. 1. One sample was unexposed and the remaining samples were exposed to the $10^{-2}$ s exposure of an EG&G sensitometer with a different neutral density filter in the exposure beam for each strip.

One strip at a time was placed next to the sample capacitor in the apparatus of FIG. 1. The system was tuned and the room temperature photoconductivity signal was measured several times by moving the sample up to an unexposed position after each measurement. The measurement exposure was a strobe exposure that was filtered with a Wratten 47b (blue) filter and focused into a 100 $\mu$m optical fiber. The other end of the optical fiber was placed in a holder in close proximity to the gap in the sample capacitor. Only a portion of the entire sample was exposed during the measurement. The same strips that were measured were then processed in Kodak Rapid X-ray (KRX) developer (3 minutes@20° C.). Table 1 below records the exposure, the photoconductivity signal observed, and the corresponding developed density of the comparison coating:

TABLE 1

| $10^{-2}$ EG&G Exposure | Photoconductivity Signal (mV) | Comparative Developed Density |
|---|---|---|
| No Exposure | 83 ± 3 | .54 (AHU) |
| +2.1 ND | 70 ± 1 | .76 |
| +1.5 ND | 64 ± 1 | 1.88 |
| +1.0 ND | 55 ± 1 | 2.38 |
| No ND | 39 ± 1 | 2.98 |

Figure 10:
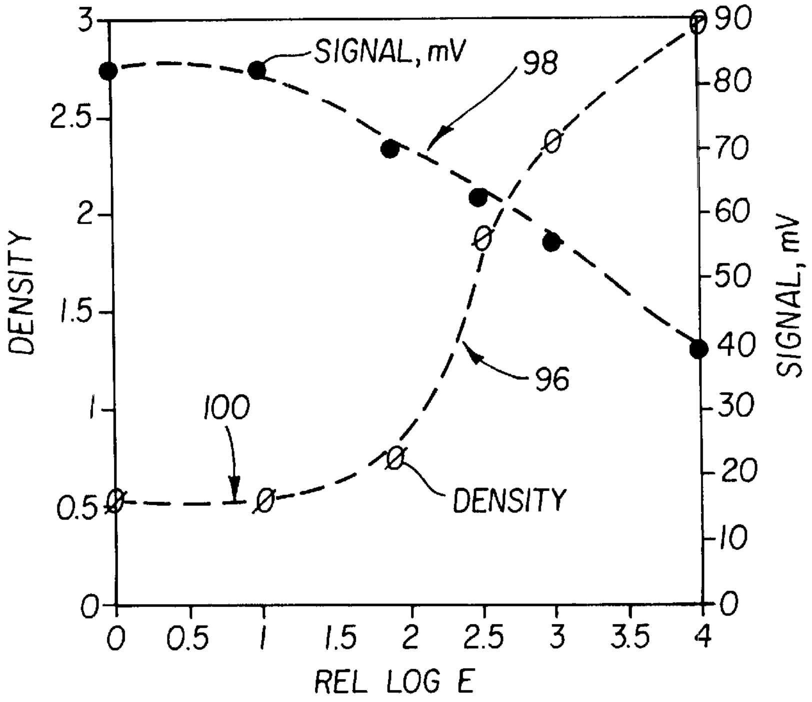
FIG. 10 illustrates a silver density vs. exposure curve obtained by chemical processing and a signal in mV vs. exposure curve obtained by electronic processing of identically exposed photographic samples.

FIG. 10 is a plot of this data and shows a comparison for the blue sensitized emulsion of the density versus log relative exposure curve 96 obtained by chemical processing and the signal in mV versus log relative exposure 98 obtained by measuring the photoconductivity response of the film while scanning with a light beam. The background density on the chemically processed curve 100 represents the background density due to the antihalation layer (AHU). The response of the red and green sensitized layers is similar.

The invention has been described in detail with particular reference to certain preferred embodiments thereof, but it will be understood that variations and modifications can be effected within the spirit and scope of the invention.

| | |
|---|---|
| 10 | radio frequency photoconductivity measurement apparatus |
| 12 | radio frequency signal generator |
| 14 | radio frequency bridge |
| 16 | 50 ohm terminator |
| 18 | tuned LC circuit |
| 20 | preamplifier |
| 22 | detector |
| 24 | inductor |
| 26 | sample capacitor |
| 26a,b | capacitor plate |
| 27a,b | slots in capacitor plates |
| 28 | variable capacitor |
| 29 | photographic film element |
| 30 | scanning light beam |
| 32 | gap |
| 34 | drive wheel |

-continued

| | |
|---|---|
| 36 | idle wheel |
| 38 | motor |
| 40a,b | insulating regions |
| 41 | capacitor |
| 41a,b | coplanar plates |
| 42 | capacitor |
| 42a,b | coplanar plates |
| 44 | LED array |
| 46 | LED array |
| (48) | exposed photographic element step |
| (50) | place element adjacent sample capacitor step |
| (52) | scanning element step |
| (54) | measure and record step |
| (56) | advance step |
| (58) | check step |
| (60) | display step |
| (62) | storage step |
| 78 | film base |
| 80 | antihalation layer |
| 82 | red and green emulsion layer |
| 84 | yellow filter layer |
| 86 | blue sensitized emulsion layer |
| 88 | gelatin overcoat |
| 90 | silver halide grains |
| 92 | film base |
| 94 | electric field |
| 96 | density vs. relative exposure curve |
| 98 | signal vs. relative exposure curve |
| 100 | background density curve |

What is claimed is:

1. A method of electronic processing of a latent image from a photographic element the method employing pulsed radiation and radio frequency photoconductivity apparatus having a sample capacitor with a gap, comprising the steps of:

a) placing the element in an electromagnetic field adjacent the sample capacitor;

b) providing an advance mechanism for advancing the photographic element past the capacitor;

c) scanning the element through the gap in the sample capacitor with a pulsed, focused beam of radiation;

d) directly measuring the photoelectron response of the element and recording the resulting signals from the radio frequency photoconductivity apparatus;

e) advancing the element and repeating steps c) and d); and wherein the photographic element includes a planar support and a silver halide emulsion having silver halide grains with long dimension oriented parallel to the plane of the support, and the element is arranged with respect to the capacitor in a way such that the electromagnetic field lines generated by the capacitor are parallel to the plane of the support.

2. The method claimed in claim 1, wherein the capacitor plates are provided with a slot through which the photographic element is located.

3. The method claimed in claim 2, wherein the capacitor plates are coplanar.

4. A method of electronic processing of a latent image from a photographic element the method employing pulsed radiation and radio frequency photoconductivity apparatus having a sample capacitor with a gap, comprising the steps of:

a) placing the element in an electromagnetic field adjacent the sample capacitor;

b) providing an advance mechanism for advancing the photographic element past the capacitor;

c) scanning the element through the gap in the sample capacitor with a pulsed, focused beam of radiation;

d) directly measuring the photoelectron response of the element and recording the resulting signals from the radio frequency photoconductivity apparatus;

e) advancing the element and repeating steps c) and d);

f) providing a photographic element having a Ruthenium hexacyano doped tabular grain emulsion with a grain size greater than 2 $\mu$m; and g) measuring the photoelectron response at ambient temperature.

5. A method of electronic processing of a latent image from a photographic element the method employing pulsed radiation and radio frequency photoconductivity apparatus having a sample capacitor with a gap, comprising the steps of:

a) placing the element in an electromagnetic field adjacent the sample capacitor;

b) providing an advance mechanism for advancing the photographic element past the capacitor;

c) scanning the element through the gap in the sample capacitor with a pulsed, focused beam of radiation;

d) directly measuring the photoelectron response of the element and recording the resulting signals from the radio frequency photoconductivity apparatus;

e) advancing the element and repeating steps c) and d); and f) wherein the photographic element is a color photographic element having a plurality of layers sensitive to a plurality of wavelengths of light, and wherein the step of scanning the element includes separately scanning the element with corresponding wavelengths of light.

6. The method claimed in claim 5, wherein the photographic element is sensitive to red, green, and blue wavelengths of light, and the element includes a film base, a red and green sensitive emulsion layer over the film base, a yellow filter layer over the red and green sensitive emulsion layer, and a blue layer over the yellow filter layer.

7. Radio frequency photoconductivity apparatus for electronically processing a latent image from a photographic element, comprising:

a) a sample capacitor with a gap for directly measuring the photoelectron response of the element in response to a pulse of radiation;

b) means for locating the element in an electromagnetic field adjacent the sample capacitor;

c) an advance mechanism for advancing the photographic element past the capacitor;

d) a scanner for scanning the element through the gap in the sample capacitor with a pulsed, focused beam of radiation;

e) a detector for detecting the signals induced on the capacitor in response to the pulses of radiation on the element;

f) a recorder for recording the signals; and g) wherein the photographic element includes a planar support and a silver halide emulsion having silver halide grains with long dimension oriented parallel to the plane of the support, and the element is arranged with respect to the capacitor in a way such that the electromagnetic field lines generated by the capacitor are parallel to the plane of the support.

8. The apparatus claimed in claim 7, further comprising a display for displaying the signals.

9. The apparatus claimed in claim 8, wherein the capacitor plates are provided with a slot through which the photographic element is located.

10. The apparatus claimed in claim 9, wherein the capacitor plates are coplanar.

11. The apparatus claimed in claim 7, wherein the photographic element includes a Ruthenium hexacyano doped tabular grain emulsion with a grain size greater than 2 $\mu$m, and the radio frequency photoconductivity apparatus is adapted to measure the photoelectron response at ambient temperature.

12. The apparatus claimed in claim 7, wherein the photographic element is a color photographic element having a plurality of layers sensitive to a plurality of wavelengths of light, and wherein the scanner is adapted to scan the element with corresponding wavelengths of light.

* * * * *